July 3, 1951
J. E. ADAMS ET AL
2,559,182
AUTOMOBILE JACK
Filed Jan. 28, 1946
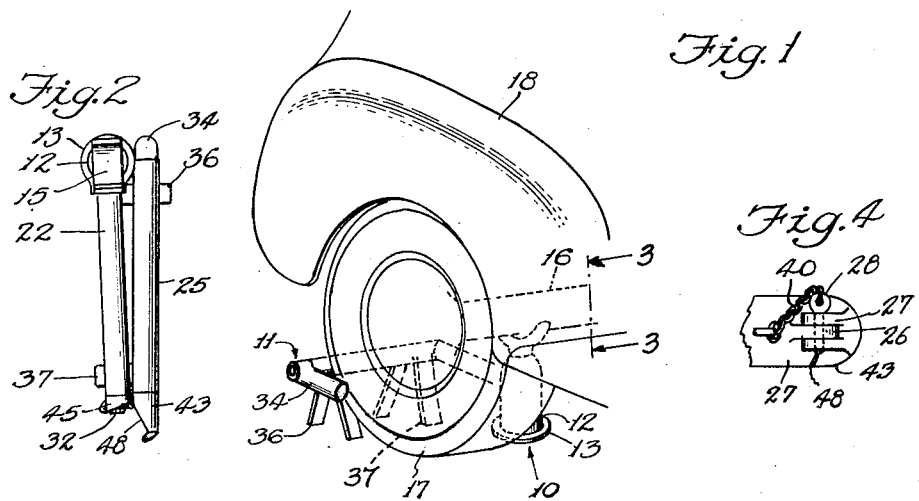
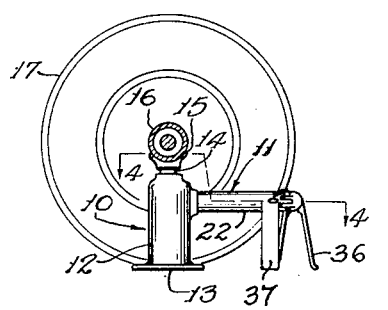
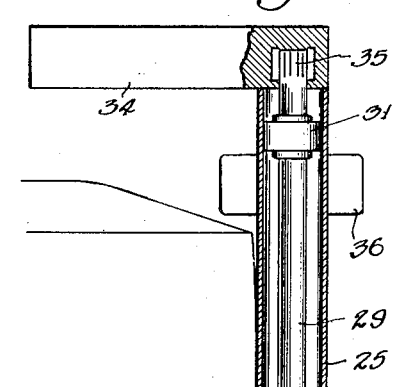
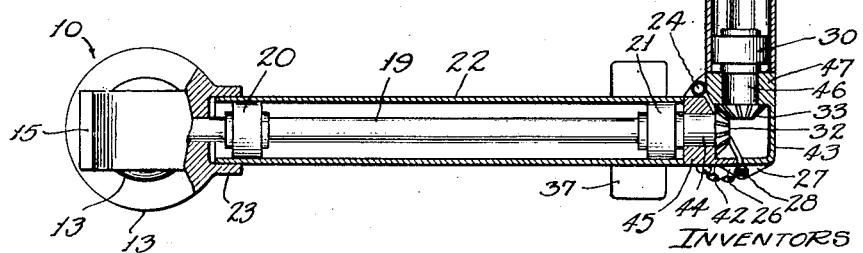
INVENTORS
JOHN E. ADAMS
GEORGE E. WAGNER
By Lynn Latta
Attorney Patented July 3, 1951

2,559,182

UNITED STATES PATENT OFFICE 2,559,182

AUTOMOBILE JACK

John E. Adams and George E. Wagner,
Los Angeles, Calif.

Application January 28, 1946, Serial No. 643,892

8 Claims. (Cl. 254—1)

This invention relates to automobile jacks. It is directed primarily to the type of jack that is normally carried in each passenger vehicle as emergency equipment for the jacking up of a wheel when a flat tire or wheel has to be removed or repaired. The invention is particularly useful in connection with that type of jack which is designed to exert its lifting action directly against the vehicle axle.

While a great deal of improvement has been made in this type of automobile jack, all such jacks still have the objectionable characteristics of requiring considerable maneuvering for accurate centering beneath the vehicle axle. This is largely due to the fact that the body of the vehicle overhangs the axle to such an extent that it is practically impossible to accurately locate the jack beneath the center of the axle by sighting beneath the body of the vehicle. Consequently, it is usually necessary for the person changing a tire or wheel to crawl at least partially beneath the vehicle in order to place the jack in the proper position with reference to the axle.

The primary object of our invention is to provide a jack having means whereby it may be accurately located under the vehicle axle without the necessity for sighting beneath the body of the vehicle. More specifically, the invention contemplates a jack having means to engage the tread of the tire to be changed, and so designed that with this member in engagement with the tire, the jack will be directly beneath the center line of the vehicle axle. A further object is to provide a jack having means to be located in a predetermined position with reference to an external side wall of the tire (where the view of the operator is unobstructed) for the purpose of gauging the proper position of the jack longitudinally of the axle.

A further object of the invention is to provide a jack which incorporates the above referred to locating apparatus without being materially more complex than the conventional tire jack. To this end, the invention contemplates a tire jack having a member which serves the dual function of providing a casing for a power transmitting shaft and engaging the tread of the tire for locating the jack. To the same end, the invention provides a jack having a handle for transmitting power to the jack and also for gauging the position of the jack longitudinally of the axle, with reference to the outer wall of the tire.

Another object of the invention is to provide a jack having means for supporting the aforesaid casing member at the proper height for correct engagement with the tire tread and at the same time eliminating the necessity for the operator to support the power transmitting mechanism in his hand while operating the jack. Operation of the jack entails simply the oscillation of the crank handle.

A further object of the invention is to provide a jack which may be folded into a compact bundle for storage.

Other objects of the invention will appear from a perusal of the following specification, when read in connection with the appended drawings, in which:

Fig. 1 is a perspective view of a rear portion of an automobile with my improved jack applied thereto;

Fig. 2 is a plan view of my improved jack in its folded position;

Fig. 3 is a vertical transverse sectional view through the vehicle axle, showing my improved jack applied thereto, taken as indicated by the line 3—3 of Fig. 1;

Fig. 4 is a detail of the hinge; and

Fig. 5 is a horizontal sectional view of the jack taken on the line 5—5 of Fig. 3.

As an example of one form in which the invention may be embodied, I have shown in the drawings a tire jack which embodies a jack body 10 and power transmitting mechanism which is indicated generally at 11. The jack body 10 embodies a pedestal 12 having a base 13 adapted to rest upon a supporting surface, and a screw shaft 14 having a head or saddle 15 properly shaped to engage the underside of the vehicle axle housing 16.

The wheel of the vehicle is indicated at 17 and, in Fig. 1, a portion of a vehicle body including the fender 18, is indicated.

Within the pedestal 12 a suitable conventional rotating nut coacts with the screw shaft 14 to lift the shaft when rotated in one direction and to withdraw the shaft back into the pedestal 12 when rotated in the other direction. Since such mechanism is well known, it has not been illustrated in the drawings. Through suitable bevel gearing, which also is well known and therefore not illustrated, movement is transmitted to the nut by a shaft 19 that is journalled in bearings 20 and 21 mounted in a tubular housing 22. One end of the housing 22 is secured in a boss 23 on the pedestal 12, and the other end of the housing 22 is hinged, at 24, to the transverse tubular housing member 25. The hinge 24 forms a connection between a pair of joint members 42 and 43. The joint member 42 has a swivel connection with the housing member 22, such connection being provided by the hub 44 of a bevel gear 32, which is journalled in a collar 45 in the joint member 42, and the back of a gear 33, which has end thrust bearing engagement against the collar 45. Similarly, the joint member 43 has a swivel connection with the housing member 23 through the hub 46 of the gear 33, journalled in a collar 47 on the joint member 43, and the end thrust bearing engagement of the gear 33 against the collar 47. The joint members 42 and 43 come together along a parting line 48.

The joint members 42 and 43 are provided with lugs 26 and 27 having openings that are adapted to register when the housings are in the extended relation shown in Fig. 4, and to receive a pin 28 to lock the housings in that relation.

A transmission shaft 29 is journalled in bearings 30 and 31 in the respective ends of the housing member 25, and has secured to one end a bevel gear 32 which meshes with a bevel gear 33 attached to the adjacent end of the shaft 19. The other end of the shaft 19 is attached to one of the bevel gears previously mentioned, by means of which the threaded nut or sleeve of the jack body 10 is rotated.

A crank handle 34 is connected to the other end of the shaft 29, either by a rigid connection or through a conventional ratchet mechanism 35 of the type adapted to selectively give a one way drive in either direction. Such ratchet mechanisms are common in bit braces and socket wrenches, etc. and the details thereof are therefore not shown herein.

The housing member 25 is so related to the main jack body 10 that its engagement with the tread of the tire 17 at the proper height from the ground, will accurately position the jack body 10 beneath the center of the axle 16. The proper height for engagement with the tire 17 is determined by a standard 36 rigidly attached to the housing member 25, near the handle end thereof. The corner between the casing members 22 and 25 is supported at the same height by a standard 37 which is rigidly attached to the housing member 22 near the hinge 24. The height of the standards 36 and 37 is selected so as to correspond to the height of the boss 23 above the base 13, whereby to position the casing members 22 and 25 in a plane parallel to the supporting surface when the jack is in use.

The position of the jack body 10 longitudinally of the axle 16 is determined by the spacing between the handle 34 and the outer side wall of the tire 17. For example, this spacing may be specified to be two inches (sufficient to permit ample clearance between the operator's knuckles and the side wall of the tire 17). This distance may be gauged by the eye, with sufficient accuracy to position the saddle 15 to clear spring shackles, yokes, bolts, etc. on the axle 16.

Removal of the pin 28 permits the casing member 25 to be folded against the jack body 10 as shown in Fig. 2, the handle 34 first being moved downwardly to a vertical position paralleling the pedestal 12. The pin 28 may be permanently attached to the casing member 22 by a chain 40 in order to avoid its being lost. The bevel gears 32 and 33 are arranged to separate from each other freely as the transmission casing mechanism is broken at the hinge 24, and to re-engage when the mechanism is opened again to the position shown in Fig. 4.

In the operation of our improved tire jack, after the jack has been removed from the tool chest it is opened out to the extended relation shown in Fig. 4 and the pin 28 inserted through the lugs 26 and 27 to lock the transmission mechanism in this relation. The jack body 10 is then slid beneath the vehicle, the casing member 25 being used as a handle for this purpose and the stands 36 and 37 resting upon the supporting surface and thereby maintaining the base 13 in flat contact with the supporting surface (assuming that the supporting surface is fairly flat) and the entire assembly oriented so that the casing 22 is generally parallel to the inner side of the tire and the casing 25 is generally transverse to the plane of the tire.

When the casing member 25 thus engages the tread of the tire 17, the jack body 10 will automatically be centered beneath the axle 16. The proper position of the jack body longitudinally of the axle may then be adjusted by sliding the entire jack assembly parallel to the casing member 25 until the spacing between the handle 34 and the outer side wall of the tire 17 reaches the prescribed value. The jack is then exactly in the proper position for engagement with the axle and no further attention need be given to the detail. The operator then oscillates or rotates the handle 34 to elevate the saddle 15 into contact with the axle 16 and to lift the axle and wheel to the desired height.

In Figs. 1 and 4 the jack is shown applied to a right rear wheel. It may be applied equally as well to a left wheel by swinging the housing 25 about the swivel joint 44, 45 and rotating the housing 25 about the swivel joint 46, 47 to bring the pedestal 36 to a depending position.

One of the functions and advantages of the standard 37 is to prevent the jack body 10 tipping over rearwardly when the full weight of the vehicle axle is supported thereby. Often this will happen when the supporting surface is inclined toward the rear. It cannot happen with our jack because engagement of the pedestal 12 with the ground, acting through the housing 22 which functions as a lever, prevents the pedestal 12 from tilting rearwardly.

The pedestal 36 may be incorporated with a similar function by attaching the housing 22 rigidly to the pedestal 12 and employing a hinge 24 of sufficient ruggedness to carry the torque of a side tilting load on the pedestal 12. However, we prefer to employ a construction wherein such loads are not transmitted to the hinge 24, and consequently the connection between the casing 22 and the pedestal 12 is a rotatable connection.

We claim as our invention:

1. A jack for an automobile having an axle and a tire, comprising a jack body including means for engaging the under side of said axle and lifting the same, and means for transmitting lifting power to said lifting means, comprising an element attached to said jack body and extending transversely thereto, a second element attached to said first mentioned element and extending transversely thereto, and a handle at the end of said second mentioned element opposite said first mentioned element, said second mentioned element being adapted to engage the rear side of said tire and being so related to said jack body that when in such engagement it will accurately locate the position of said jack body in centered relation below said axle, and said handle being arranged to be located in a predetermined relation to the outer side wall of said tire and to thereby properly locate said jack body longitudinally of said axle the length of said second mentioned element being not substantially greater than twice the width of the tire, whereby the positioning of said jack with said handle having substantially knuckle clearance with relation to the outer side of said tire may function to dispose said jack just sufficiently spaced from the inner side of said tire to provide for clearance of impedimenta on said axle adjacent said tire, whereby to provide maximum accuracy of automatic positioning of said jack body beneath said axle through the engagement of the tire tread by said second member.

2. A jack for an automobile having an axle and a tire, comprising a jack body having means for engaging the under side of said axle and lifting the same, and power transmitting mechanism including a first housing member attached to said main jack body and extending transversely thereto and a second housing member hinged to said first housing member for movement from a position lying alongside first housing member to a position forming an L with said first housing member, power transmitting shaft sections journalled in respective housing members, bevel gears attached to the adjacent ends of said shaft sections adjacent said hinge and adapted to move freely in and out of mesh with each other as said housing sections are hinged relative to each other, and means for transmitting rotation to the shaft section that extends through said second housing member, at the end thereof opposite said bevel gearing.

3. An automobile jack comprising a jack body including elevating means and power transmitting mechanism including a first housing member attached to said main jack body and extending laterally therefrom, and a second housing member hinged to said first housing member for movement from a folded position substantially paralleling said first housing member to an open position extending approximately at right angles to said first housing member, rotatable power transmitting shafts journalled in the respective housing members, bevel gears on the ends of said shafts adjacent said hinge, adapted to freely move into and out of mesh as said housing members are opened and folded respectively, and means for transmitting rotation to the end of the shaft in said second housing member opposite said bevel gearing.

4. An automobile jack comprising a jack body including elevating means and power transmitting mechanism including a first housing member attached to said jack body and extending laterally therefrom, and a second housing member hinged to said first housing member for movement from a folded position substantially paralleling said first housing member to an open position extending approximately at right angles to said first housing member, rotatable power transmitting shafts journalled in the respective housing members, bevel gears on the ends of said shafts adjacent said hinge, adapted to freely move into and out of mesh as said housing members are opened and folded respectively, and means for transmitting rotation to the end of the shaft in said second housing member opposite said bevel gearing, a pedestal member attached to said first housing member adjacent said hinge, and a pedestal member attached to said second housing member adjacent the last power transmitting means, said pedestal members being so related to said main jack body as to cooperate therewith in supporting said housing members in a plane parallel to the supporting surface.

5. In a jack for an automobile having an axle and a tire: a jack body including axle engaging means and elevating mechanism; and means for transmitting power to said elevating mechanism, comprising first and second shaft like members connected together end to end at right angles to each other in the form of an L having a substantially unobstructed corner space between said members to receive said tire, and a handle at the outer end of said second member, said first member being connected to said jack body at right angles to the lifting axis thereof, the length of said second member being such that, with said second member extending transversely to the plane of the tire and in contact with the tread thereof near a rear extremity of said tread, and with said handle at knuckle clearance distance from the outer side of said tire, said first member will be arranged substantially parallel to the inner side of said tire and fairly close thereto, with just enough spacing to dispose said axle engaging member in a position clearing impedimenta on said axle adjacent said tire, and the length of said first member being such that, with the parts thus disposed, the dimension from the lifting axis of said jack body to the inner side of said second member will be substantially the same as the distance from the axle axis to the said rear extremity of the tire tread, whereby such engagement of the tire tread by said second member may function to position the jack body beneath the axle with sufficient accuracy to assure proper assumption of the load by said axle engaging member when the latter is elevated.

6. A jack as defined in claim 5, including ground engaging means carried by said first and second members and adapted by engagement with a supporting surface, to position said first and second members in a substantially horizontal plane with said second member at a proper height to engage the tire tread near a rear extremity thereof.

7. A jack as defined in claim 6, wherein said first and second members comprise tubular housings and wherein said transmitting mechanism includes shafts journalled in said housings and meshing bevel gears on the respective ends of said shafts at the corner of said L, for transmitting rotation between said shafts.

8. A jack as defined in claim 5, wherein said first and second members are roughly of equal length.

JOHN E. ADAMS.
GEORGE E. WAGNER.

REFERENCES CITED

The following references are of record in the file of this patent:

UNITED STATES PATENTS

| Number | Name | Date |
| --- | --- | --- |
| 1,245,921 | Holdren | Nov. 6, 1917 |
| 1,964,173 | Quinn | June 26, 1934 |
| 2,045,016 | Leary | June 23, 1936 |
| 2,161,053 | Inman | June 6, 1939 |